Oct. 18, 1955  D. L. COTTLE ET AL  2,721,222
SEPERATION OF ETHERS
Filed Oct. 4, 1951
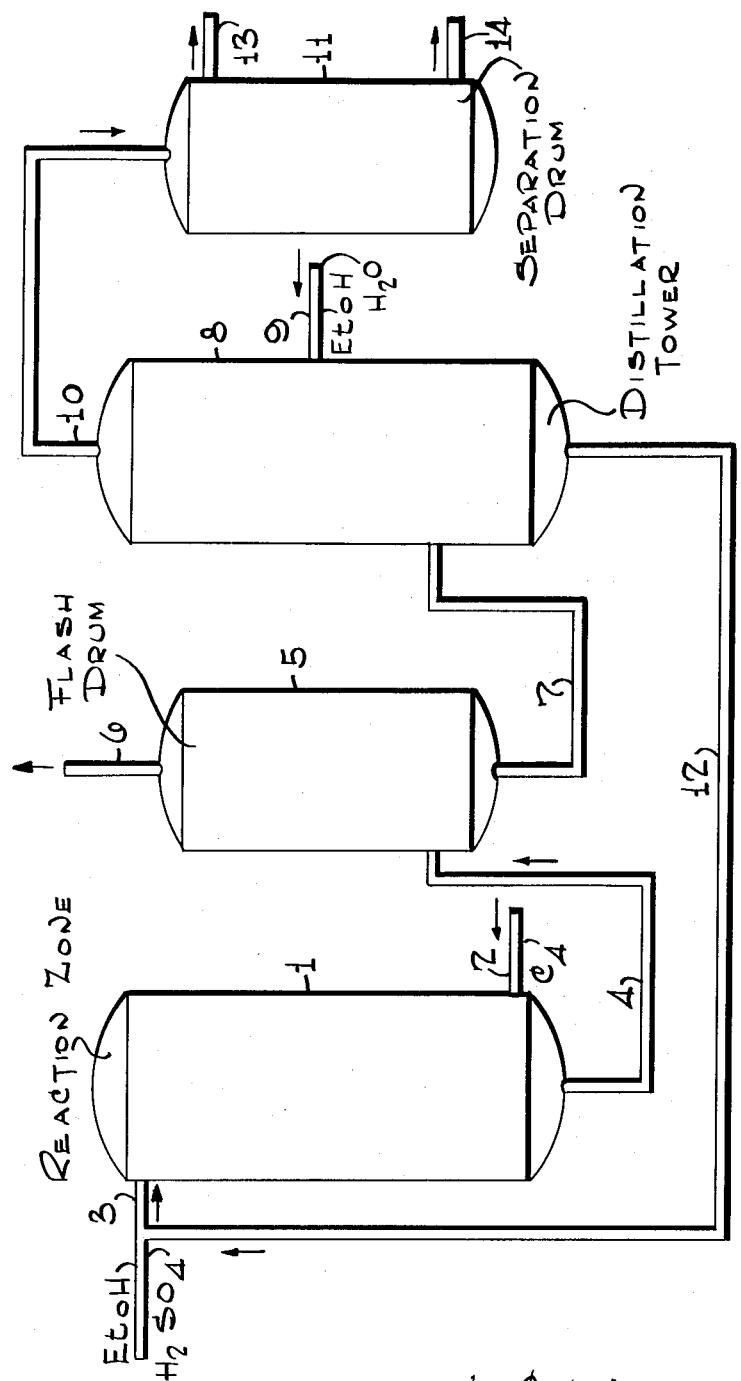
Delmer L. Cottle
Byron M. Vanderbilt   Inventors
Brook I. Smith
By Henry Berk  Attorney

United States Patent Office 2,721,222
Patented Oct. 18, 1955

2,721,222

SEPARATION OF ETHERS

Delmer L. Cottle, Highland Park, Byron M. Vanderbilt, Westfield, and Brook I. Smith, Elizabeth, N. J., assignors to Esso Research and Engineering Company, a corporation of Delaware Application October 4, 1951, Serial No. 249,762

4 Claims. (Cl. 260—616)

This invention relates to a novel method of separating tertiary ethers in a mixture prepared by the reaction of alcohols with olefins in the presence of a sulfuric acid catalyst.

The synthesis of mixed tertiary ethers having the general formula ROC(R')3 where R and R' are alkyl groups which can be the same or different, from tertiary base olefins and primary and secondary alcohols with sulfuric acid catalyst has been known since 1907 (Reychler, Bull. Soc. Chem. Blg., 21, 71 (1907)). In general a mixture of alcohol, olefin and sulfuric acid are heated to some temperature below 150° C., the acid removed by washing with water or with water containing a neutralizing agent, and the ether separated from the alcohol by the aqueous extraction methods. In the case of water washing the acid is too dilute for recycle and must be discarded or reconcentrated. If an alkaline wash is used the resulting salt represents a disposal problem. The recovery of alcohol and ether from the water or alkaline water wash is expensive.

The general equation for the preparation of ethers is illustrated in Equation I below:

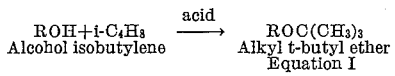

Distillation of these alkyl tertiary ethers in the presence of sulfuric acid appears not to have been tried because of the greater susceptibility of these ethers to decomposition as compared to ethers such as diethyl ether and diisopropyl ethers which contain no tertiary alkyl groups.

This invention provides a method of overcoming the beforementioned difficulties. The method comprises, among other things, adding an alcohol to the etherification mixture comprising principally ether, alcohol and sulfuric acid, and conducting the ether distillation in the presence of the excess added alcohol. As explained in further detail below, the alcohols can be anhydrous or contain water. The binary azeotrope of ether and alcohol, or, as the case may be, the ternary azeotrope of ether, alcohol, and water, is taken overhead, and by reducing the boiling point of the ether facilitates the separation of the ether from the recycle alcohol. A bottoms product from the distillation comprising principally alcohol and sulfuric acid is available for recycling to the reaction zone.

The excess alcohol can be added before the reaction with the olefin or after reaction, but in any case prior to or during the distillation of the ether. The quantity utilized is approximately that sufficient to make up for the alcohol used up in etherification reaction plus the amount required to distill with the ether in the form of an azeotrope or other physical mixture. For example, if isobutylene and methanol were quantitatively converted to tertiary butyl methyl ether, the resulting mixture would be admixed with one mole of methanol for every mole of methanol converted to ether plus enough methanol to form the methanol-tertiary butyl methyl ether azeotrope.

This alcohol diluted mixture is then distilled, the ether being removed as ether or as an azeotrope with the alcohol or as a water-alcohol-ether azeotrope. The bulk of the alcohol and all the sulfuric acid are left behind and are available for recycling to the etherification zone. The various phosphoric, phosphonic, aryl sulfonic acids, alkyl hydrogen sulfates, and the like may be employed as catalysts.

Alcohols boiling up to 200° C. can be added as indicated in the distillation zone, but methyl, ethyl and isopropyl alcohols are preferred. These alcohols can be relatively anhydrous or can contain water. Some of them may contain up to 25 weight percent water. The use of an alcohol which contains water results in the formation of a ternary azeotrope in the distillation. In many cases this is actually advantageous, since, as can be seen from the figures presented below, the ternary azeotropes boil at lower temperatures than the binary azeotropes. This affords more economical separation of the ether from the recycle alcohol. The utilization of alcohols containing some water permits these two components to cooperate in a surprising manner so as to facilitate ether separation. The water present permits the formation of a ternary azeotrope, and thereby reduces the boiling point of the ether to make it more easily separable from the recycle alcohol. The excess alcohol displaces water from its combination with sulfuric acid, thus enabling the water to go overhead. The excess alcohol also displaces ether from its combination with sulfuric acid and thus simultaneously enables the ether to go overhead and prevents its destruction by the sulfuric acid prior to going overhead. As shown by Example III below, the alcohol-sulfuric acid mixture left as a residue from the distillation is in a form suitable for recycling.

It is one of the features of this invention that alcohol containing water can be used in the distillation and yet give an alcohol-sulfuric acid stream suitable for recycling to the etherification zone. It would have been expected that the sulfuric acid would have been so wet (1) that it would have no catalytic action, or (2) that the water content would have resulted in the formation of t-butyl alcohol by hydration of isobutylene or by hydrolysis of the alkyl t-butyl ether. The results given in Example III show that these phenomena did not take place or that they took place to a relatively negligible extent.

The olefins themselves which can be used in the etherification reaction include isobutylene, 2-methyl-2-butene, 2-methyl-1-butene, 3 - methyl - 2-pentene, 2,3-dimethyl-2-butene, 2-methyl-2-pentene, 3-methyl-2-pentene, 2-ethyl-1-butene, 2,3 - dimethyl - 1 - butene, 2 - methyl-1-pentene. There is no exact limit to the molecular weight or number of carbon atoms in the olefins used, except that they be of a tertiary base type and preferably containing 3 to 6 carbon atoms. Such olefins are those in which at least one of the carbon atoms attached to the double bond is attached to no hydrogen atoms.

The alcohols which can be used for etherification with olefins include a wide variety of primary and secondary alcohols. Tertiary alcohols are not suitable. It is preferred, however, to utilize ethyl, methyl, or isopropyl alcohol or mixtures thereof, since the ethers derived therefrom have the greatest utility. The alcohol added in the distillation step can be the same as or different from the alcohol used in the etherification step. Utilization of a different alcohol in distillation may result in the obtaining of an ether mixture when the residual alcohol and sulfuric acid is recycled. It is probably preferable to utilize the same alcohol to avoid this possibility, although for some purposes mixtures of ethers may be wanted.

The olefin etherification reaction mixtures separated comprise principally, as explained above, ether, alcohol, and sulfuric acid, and are thus largely independent of the etherification variables other than concentration. Since the latter are known and constitute no part of this invention, they need not be elaborated upon here.

This invention will be better understood by reference to the flow diagram shown in the drawing, Figure I.

The description deals with ethyl t-butyl ether prepared from an isobutylene cut and ethanol, utilizing sulfuric acid as the catalyst.

In the system shown a hydrocarbon C4 stream containing isobutylene enters the bottom of the etherification zone 1 through line 2. The ethyl alcohol, sulfuric acid stream enters the upper portion of etherification zone 1 through line 3. A countercurrent contacting is thereby obtained in the reaction zone, which is maintained at a temperature of about 100° C. After the reaction is substantially completed, a liquid bottoms stream is drawn off through line 4. The mixture therein comprises unconverted hydrocarbon, the ethyl t-butyl ether, sulfuric acid, and ethanol. Line 4 leads into flash drum 5, from which the unconverted hydrocarbons are vented overhead through line 6. The residual mixture taken off as bottoms from flash drum 5 comprises principally ethyl t-butyl ether, ethanol and sulfuric acid, and is fed from line 7 to distillation tower 8. Ethanol containing approximately 5% water is fed into the distillation zone through line 9. Sufficient ethanol is added to compensate for all the ethanol consumed in the etherification reaction, plus enough ethanol to form the ethyl tertiary butyl ether-water-ethanol azeotrope. Detailed exemplary figures are presented below under the table headed "Pertinent azeotropes and compounds connected with ethyl tertiary butyl ether." The mixture is fractionated to take overhead through line 10 a physical mixture comprising water, ether, and ethanol, which is sent to separation drum 11. The bottoms from distillation zone 8 containing ethanol and sulfuric acid is returned through line 12 into line 3 to etherification zone 1. Two phases are present in separation zone 11, the top organic phase containing alcohol and ether, and the bottom aqueous phase containing alcohol. The top phase is drawn off through line 13 and the alcohol separated from the ether by water washing. The ether can then be worked up in the conventional manner. The aqueous layer takeoff is line 14.

The following examples provide additional details of the process and highlight its advantages.

EXAMPLE I

Five moles (160 grams) of methanol, 9.2 grams of sulfuric acid, 194 grams (3.46 moles) isobutylene were added to a one liter steel vessel which was mounted on a shaking machine. After heating for one hour at 100° C. the container was cooled to room temperature. No gas was released on opening the container, but 0.27 mole was driven out of the solution after addition of 160 grams methanol and heating to a still head temperature of 49° C. Distillation through a 30-plate Oldershaw column at 20/1 reflux ratio produced no more gas and 302.5 grams of distillate below 54.7° C. still head temperature. Of this overhead, 85% was t-butyl methyl ether, or 257 grams or 92 mole percent based on isobutylene converted.

The residue weighed 165 grams. This residue was fortified with 6 grams of methanol and treated with 249 grams (4.45 moles) of isobutylene at 100° C. for one hour. No gas was evolved on opening the container, but after addition of 160 grams of methanol and heating to a still head temperature of 49.4° C., 0.60 mole of isobutylene was evolved. Fractional distillation gave 345 grams distilling below 54.1° C. which contained 293 grams of t-butyl methyl ether or 87 mole per cent yield based on isobutylene converted. The yield of ether on isobutylene charged was 75 mole per cent.

This example demonstrates the efficiency of the process, both in terms of yields obtained and the fact that the bottoms from the distillation, i. e., substantially anhydrous alcohol and sulfuric acid, are completely reusable in the etherification reaction itself.

EXAMPLE II

This example illustrates the efficacy of the added alcohol in preventing product decomposition during distillation. In these experiments methyl tertiary butyl ether was separated from the indicated reaction mixtures by distillation through a 30-plate Oldershaw column at a 20/1 reflux ratio. The following pair of runs show that the ether is partially decomposed when it is separated by fractional distillation from a reaction mixture unless a certain amount of free methanol is present:

*Effect of make-up methanol on the stability of methyl t-butyl ether during distillation from a reaction mixture*

| Ether Yield in Mole Percent | Methanol Added Before Distillation | Methanol/iso C4=Mole Ratio in the Reactor |
| --- | --- | --- |
| 75 | Yes | 1.12 |
| 59 | No | 1.08 |

This example demonstrates clearly how a product yield increase of greater than 27% was obtained merely by conducting the distillation in the presence of excess added alcohol. It is preferable to add this alcohol during the distillation and thus avoid the additional equipment requirements involved in adding excess alcohol to the reactor.

EXAMPLE III

In the following experiments 1.25 weight per cent sulfuric acid was used as a catalyst for an etherification involving equimolar amounts of isobutylene and absolute ethanol. The reaction mixture was heated to 100° C. for 30 minutes. After mixing with a calculated quantity of ethanol containing 7.6 weight per cent water the mixture was batch-distilled through a 30-plate Oldershaw column at 15/1 reflux ratio to remove the ethyl t-butyl ether as the ether-ethanol-water and ether-alcohol azeotropes. The residue was mixed with fresh isobutylene and the entire procedure repeated. After six cycles in which the make-up alcohol for the next run was added as 92.4 weight per cent ethanol before distillation of the ether prepared in the preceding run and without further addition of sulfuric acid, the yield of ether was 61.5 mole per cent compared to 66 mole per cent for the original run.

The yields for each of the runs are given in the following table:

| Run Number | Yield of ethyl-t-butyl ether in mole per cent |
| --- | --- |
| 1 | 66 |
| 2 | 67 |
| 3 | 65 |
| 4 | 62 |
| 5 | 63 |
| 6 | |
| 7 | 61.5 |

The yield values show that catalytic efficiency for run No. 7 was 93% of that for the first run. The sulfuric acid at the end of the last run showed no tendency to foam and there was no evidence of carbon formation. Also, there was no evidence of decomposition of the ether to isobutylene and ethanol during the distillations. Therefore, it has been demonstrated (1) that wet alcohol can be used as feed for the etherification when it is dried by the azeotropic action of the ether produced in the preceding run, (2) that the ether can be removed from the sulfuric acid by distillation, and (3) that the sulfuric acid can be recycled several times without noteworthy loss in efficiency.

EAMPLE IV

The following experiment shows that sulfuric acid may be recycled in the preparation of isopropyl t-butyl ether. An equimolar mixture of isobutylene and 99% isopropyl alcohol was mixed with 1.25 weight per cent of 96% sulfuric acid and heated to 100° C. for 30 minutes. The reaction mixture contained an excess of alcohol over ether because of the lower conversion of isopropyl alcohol to ether as compared to the alkylation of methanol and ethanol. Consequently the reaction mixture was distilled using a 1-plate column without the further addition of alcohol. The yield of isopropyl t-butyl ether in the overhead was 22.4 mole per cent. The residue was brought to the original weight of the alcohol and sulfuric acid by the addition of 99% isopropyl alcohol and treated again with an equimolar quantity of isobutylene at 100° C. for 30 minutes. The yield of ether obtained by a 1-plate distillation of the reaction mixture was 21.6 mole per cent.

This demonstrates that the sulfuric acid catalyst may be recycled without noteworthy loss in efficiency after removal of the ether from the acid by distillation.

EXAMPLE V

In the following experiment an equimolar mixture of isobutylene and 99% isopropyl alcohol catalyzed by 1.25 weight per cent sulfuric acid was heated to 100° C. for 0.5 hour. Analysis of the overhead from a 1-plate distillation showed a yield of isopropyl-t-butyl ether of 21.5 mole per cent. This alcohol-ether mixture was mixed with water and distilled through a 30-plate Oldershaw column at a 20/1 reflux ratio. The alcohol-ether-water azeotrope overhead separated into two layers. The upper layer consisted largely of ether with some alcohol and a little water, and the lower layer consisted of water and alcohol and practically no ether.

Listed below are pertinent azeotropes and other boiling point data which will be of use to those who will practice this invention. Commercial methanol, 95% ethanol, and 91% isopropanol have been utilized for these data.

*Pertinent azeotropes and compounds connected with methyl t-butyl ether*

| Compound or Azeotrope | Composition of Azeotropes in Weight, Percent | Boiling Point, ° C. |
|---|---|---|
| Methyl t-butyl ether-methanol-water. | Ether 85, Methanol 15, Water 0.12. | 51.2 |
| Methyl t-butyl ether-methanol | Ether 85, Methanol 15 | 51.2 |
| Methyl t-butyl ether-water | Ether 96, Water 4 | 52.6 |
| Methyl t-butyl ether | | 55 |
| Methanol | | 65 |

A similar table follows for ethyl t-butyl ether:

*Pertinent azeotropes and compounds connected with ethyl t-butyl ether*

| Compound or Azeotrope | Composition of Azeotropes in Weight, Percent | Boiling Point, ° C. |
|---|---|---|
| Ethyl t-butyl ether-water-ethanol. | Ether 80.7, Water 9.6, Ethanol 9.5. | 63.4 |
| Ethyl t-butyl ether-water | Ether 94, Water 6.0 | 65.2 |
| Ethyl t-butyl ether-ethanol | Ether 79, Ethanol 21 | 66.6 |
| Ethyl t-butyl ether | | 72.8 |
| Ethanol-water | Ethanol 95.5, Water 4.5 | 78.1 |
| Ethanol | | 78.4 |

From this table it follows that 100 moles of ethyl t-butyl ether on distillation as the ternary azeotrope will be accompanied by 67 moles of water and 26 moles of ethanol. To replace this ternary would require 100 moles of ethanol for the synthesis of another 100 moles of ether and 26 moles of ethanol to replace that removed as the azeotrope. This 126 moles of replacement ethanol as 95% volume ethanol would contain 26 moles of water. Thus there is more than two times as much dehydrating capacity in the ternary ether-alcohol-water azeotrope as is needed to make the alcohol-sulfuric acid mixture fit for recycle.

Similar calculations show that the ether-water azeotrope contains almost one and one-half times as much water as is present in the 95% ethanol used to replace the alcohol consumed in the synthesis of the ether.

The azeotropes of isopropyl t-butyl ether are as follows:

*Pertinent azeotropes and compounds connected with isopropyl t-butyl ether*

| Compound or Azeotrope | Composition of Azeotropes in Weight, Percent | Boiling Point, ° C. |
|---|---|---|
| Isopropyl t-butyl ether-water-isopropanol. | Ether 65, Water 17, Alcohol 18. | 71 |
| Isopropyl t-butyl ether-water | Ether 86, Water 14 | 74 |
| Isopropyl t-butyl ether-isopropanol. | Ether 63, Alcohol 37 | 77 |
| Isopropanol-water | Isopropanol 88, Water 12 | 80.4 |
| Isopropanol | | 82.4 |
| Isopropyl t-butyl ether | | 87-88 |

From this tabulation it follows that 100 moles of isopropyl t-butyl ether would be accompanied by 168 moles of water and 55 moles of alcohol. In order to replace the isopropyl alcohol converted to the tertiary ether and the isopropyl alcohol in the azeotrope, it would require 155 moles of isopropyl alcohol as the isopropyl alcohol-water azeotrope, which contains 71 moles of water. Therefore, the ether-alcohol-water azeotrope in this case contains more than twice the water necessary to insure dehydration of the 91 volume per cent isopropyl alcohol used as feed alcohol. The isopropyl t-butyl ether-water azeotrope also contains more than twice as much water as the equivalent in 91 volume per cent isopropyl alcohol.

The process of this invention is applicable to any combination of the indicated olefins and alcohols which produces a mixed ether of which one of the alkyl groups is tertiary. The advantages of this process are readily apparent to those skilled in the art. Among these advantages, as has been pointed out, are the facts that product decomposition is minimized, product separation is facilitated, and the acid is available for reutilization in the etherification process.

It will be understood further that the foregoing examples and apparatus have been given merely for purposes of illustration, but that other modifications of the present invention are possible without departing from the scope of the appended claims.

What is claimed is:

1. The process of separating a tertiary alkyl ether present in a reaction mixture produced in an etherification reaction of a tertiary base olefin and an alcool, and utilizing sulfuric acid as a catalyst, said reaction mixture comprising principally the ether, the alcohol, and sulfuric acid, which comprises the steps of adding an excess quantity of an alcohol to the reaction mixture, said alcohol having a maximum boiling point of 200° C. and containing water to a maximum content of 25 weight per cent and being present in an amount about equal to that of the alcohol used up in the etherification reaction, plus the amount required to form the alcohol-ether-water azeotrope; distilling the reaction mixture in the presence of the added alcohol to take overhead an ether-water-alcohol azeotrope; separating the ether-water-alcohol azeotrope into an organic phase containing ether and alcohol and an aqueous phase; separating the alcohol in the organic phase from the ether product; taking off a bottoms fraction from the distillation step, said bottoms fraction containing alcohol, sulfuric acid, and a smaller proportion of water than was present in the combined reaction mixture with added excess alcohol and recycling this bottoms fraction containing the catalytically active sulfuric acid to the etherification step.

2. A process as in claim 1 in which the ether being separated is ethyl tertiary butyl ether and the alcohol containing water added to the reaction mixture is 95 volume per cent ethanol.

3. The process of claim 1 in which the ether is isopropyl tertiary butyl ether and the alcohol containing water added to the reaction mixture is 91 volume per cent isopropyl alcohol.

4. The process of claim 1 in which the ether is methyl tertiary butyl ether and the alcohol added to the reaction mixture is methanol.

References Cited in the file of this patent

UNITED STATES PATENTS

| | | |
|---|---|---|
| 1,482,804 | Mann | Feb. 5, 1924 |
| 1,968,601 | Edlund et al. | July 31, 1934 |
| 2,216,931 | Archibald et al. | Oct. 8, 1940 |
| 2,282,469 | Frohlich | May 12, 1942 |
| 2,365,264 | Groombridge et al. | Dec. 19, 1944 |
| 2,544,392 | Moore et al. | Mar. 6, 1951 |

FOREIGN PATENTS

| | | |
|---|---|---|
| 560,712 | Great Britain | Apr. 18, 1944 |

OTHER REFERENCES

Horsley: "Analytical Chemistry," vol. 19, p. 587 (1947).